US006985620B2

(12) United States Patent
Sawhney et al.

(10) Patent No.: US 6,985,620 B2
(45) Date of Patent: Jan. 10, 2006

(54) METHOD OF POSE ESTIMATION AND MODEL REFINEMENT FOR VIDEO REPRESENTATION OF A THREE DIMENSIONAL SCENE

(75) Inventors: Harpreet Singh Sawhney, West Windsor, NJ (US); Rakesh Kumar, Monmouth Junction, NJ (US); Steve Hsu, Cranbury, NJ (US); Supun Samarasekera, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 669 days.

(21) Appl. No.: 09/800,550

(22) Filed: Mar. 7, 2001

(65) Prior Publication Data

US 2001/0043738 A1 Nov. 22, 2001

Related U.S. Application Data

(60) Provisional application No. 60/187,557, filed on Mar. 7, 2000.

(51) Int. Cl.
*G06K 9/00* (2006.01)

(52) U.S. Cl. ............... 382/154; 382/103; 382/190; 382/294; 348/42; 348/169; 345/419

(58) Field of Classification Search ............... 382/103, 382/154, 268, 284, 294, 282, 296, 291, 190, 382/172, 168; 348/42, 47, 56, 135, 139, 348/148, 168, 580, 583, 169; 345/425, 421, 345/419, 475, 423, 418, 630, 653, 647, 634, 345/757, 664, 420

See application file for complete search history.

(56) References Cited

U.S. PATENT DOCUMENTS

| 5,644,651 | A | * | 7/1997 | Cox et al. | 382/154 |
|---|---|---|---|---|---|
| 5,850,469 | A | * | 12/1998 | Martin et al. | 382/154 |
| 6,018,349 | A | | 1/2000 | Szeliski et al. | 345/629 |
| 6,047,087 | A | * | 4/2000 | Imaizumi et al. | 382/232 |
| 6,192,145 | B1 | * | 2/2001 | Anandan et al. | 382/154 |
| 6,330,356 | B1 | * | 12/2001 | Sundareswaran et al. | 382/154 |
| 6,522,787 | B1 | * | 2/2003 | Kumar et al. | 382/268 |

FOREIGN PATENT DOCUMENTS

EP 0 898 245 2/1999

* cited by examiner

*Primary Examiner*—Bhavesh M. Mehta
*Assistant Examiner*—Sheela Chawan
(74) *Attorney, Agent, or Firm*—William J. Burke

(57) ABSTRACT

The present invention is embodied in a video flashlight method. This method creates virtual images of a scene using a dynamically updated three-dimensional model of the scene and at least one video sequence of images. An estimate of the camera pose is generated by comparing a present image to the three-dimensional model. Next, relevant features of the model are selected based on the estimated pose. The relevant features are then virtually projected onto the estimated pose and matched to features of the image. Matching errors are measured between the relevant features of the virtual projection and the features of the image. The estimated pose is then updated to reduce these matching errors. The model is also refined with updated information from the image. Meanwhile, a viewpoint for a virtual image is selected. The virtual image is then created by projecting the dynamically updated three-dimensional model onto the selected virtual viewpoint.

23 Claims, 9 Drawing Sheets

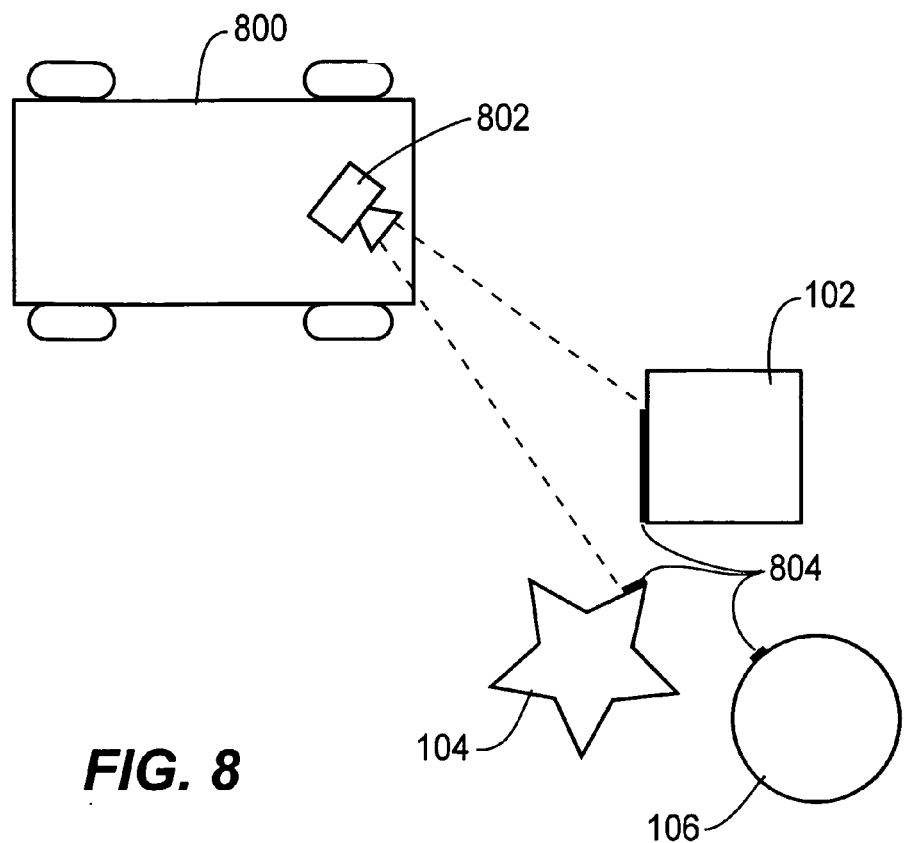
FIG. 8
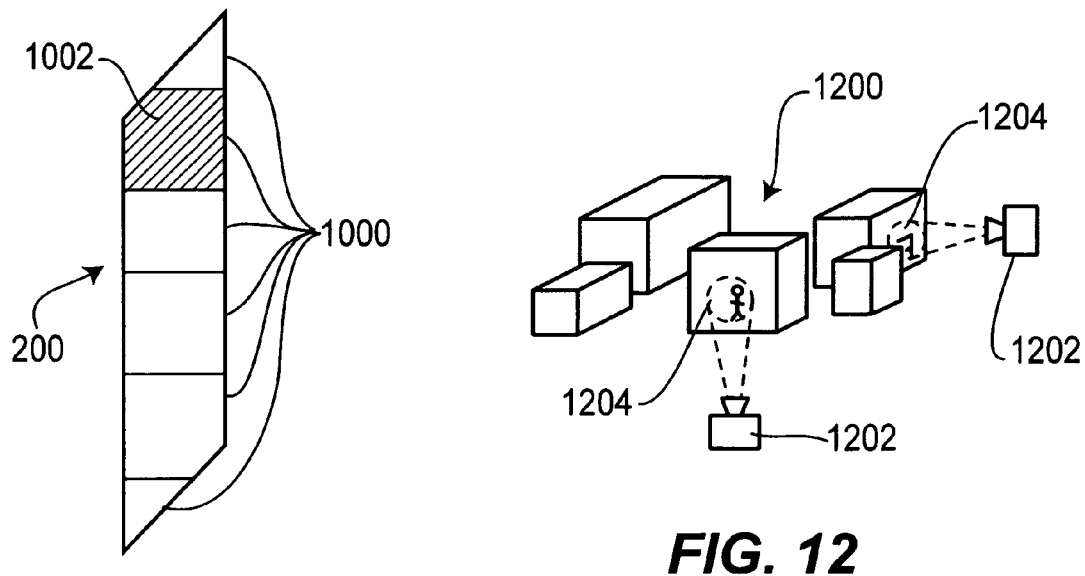
FIG. 10
FIG. 12

METHOD OF POSE ESTIMATION AND MODEL REFINEMENT FOR VIDEO REPRESENTATION OF A THREE DIMENSIONAL SCENE

This application claims the benefit of the filing date of the Provisional application No. 60/187,557 filed Mar. 7, 2000, the contents of which are incorporated herein by reference.

The U.S. Government has a paid-up license in this invention and the right in limited circumstances to require the patent owner to license others on reasonable terms as provided for by the terms of contract no. N 00019-99-C-1385 awarded by DARPA.

The present invention is directed toward the domain of image processing, in particular toward the creation and manipulation of three dimensional scene models and virtual images of the scene seen from arbitrary viewpoints.

BACKGROUND OF THE INVENTION

Tremendous progress in the computational capability of integrated electronics and increasing sophistication in the algorithms for smart video processing has lead to special effects wizardry, which creates spectacular images and otherworldly fantasies. It is also bringing advanced video and image analysis applications into the mainstream. Furthermore, video cameras are becoming ubiquitous. Video CMOS cameras costing only a few dollars are already being built into cars, portable computers and even toys. Cameras are being embedded everywhere, in all variety of products and systems just as microprocessors are.

At the same time, increasing bandwidth on the Internet and other delivery media has brought widespread use of camera systems to provide live video imagery of remote locations. In order to provide coverage of live video imagery of a remote site, it is often desirable to create representations of the environment to allow realistic viewer movement through the site. The environment consists of static parts (building, roads, trees, etc.) and dynamic parts (people, cars, etc.). The geometry of the static parts of the environment can be modeled offline using a number of well-established techniques. None of these techniques has yet provided a completely automatic solution for modeling relatively complex environments, but because the static parts do not change, offline, non-real time, interactive modeling may suffice for some applications. A number of commercially available systems (GLMX, PhotoModeler, etc.) provide interactive tools for modeling environments and objects.

For arbitrary 3D scenes, various modeling approaches have been proposed, such as image-based rendering, light fields, volume rendering, and superquadrics plus shape variations. For general modeling of static scenes, site models are known to provide a viable option. In the traditional graphics pipeline based rendering, scene and object models stored as polygonal models and scene graphs are rendered using Z-buffering and texture mapping. The complexity of such rendering is dependent on the complexity of the scene. Standard graphics pipeline hardware has been optimized for high performance rendering.

However, current site models do not include appearance representations that capture the changing appearance of the scene. Also these methods generally seek to create a high quality model from scratch, which in practice necessitates constrained motion, instrumented cameras, or interactive techniques to obtain accurate pose and structure. The pose of the camera defines both its position and orientation. The dynamic components of a scene cannot, by definition, be modeled once and for all. Even for the static parts, the appearance of the scene changes due to varying illumination and shadows, and through modifications to the environment. For maintaining up-to-date appearance of the static parts of the scene, videos provide a cost-effective and viable source of current information about the scene, but unless the cameras are fixed, the issue of obtaining accurate pose information remains.

Between a pair of real cameras, virtual viewpoints may be created by tweening images from the two nearest cameras. Optical flow methods are commonly used by themselves to create tweened images. Unfortunately, the use of only traditional optical flow methods can lead to several problems in creating a tweened image. Particularly difficult are the resolution of large motions, especially of thin structures, for example the swing of a baseball bat; and occlusion/deocclusions, for example between a person's hands and body. The body of work on structure from motion may be pertinent to 3D-scene modeling. Purely image-driven methods, however, tend to drift away from metric accuracy over extended image sequences, because there is no constraint to tie down the estimated structure to the coordinate system of the real world. That constraint must come from physical measurements like GPS, or surveyed landmarks, or from a prior scene model with shape and/or texture information. The problem of loss of metric accuracy is particularly acute for analysis and control of a remote scene in which use of such constraint indicia is not practical, for example to control a remote vehicle on Mars or underground.

SUMMARY OF THE INVENTION

The present invention is embodied in a method of accurately estimating a pose of a camera within a scene using a three dimensional model of the scene. The exemplary method begins by generating an initial estimate of the camera pose. Next, a set of relevant features of the three-dimensional model based on the estimate of the pose is selected. A virtual projection of this set of relevant features as seen from the estimated pose is then created. The virtual projection of the set of relevant features is matched to features of the received image and matching errors between the features of the image and the features of the projection are measured. The estimate of the pose is then updated to reduce the matching errors.

A second embodiment of the present invention is method of refining a three dimensional model of a scene using an image of the scene taken by a camera, which may have an unknown pose. First the image is compared to the three dimensional model of the scene to generate an estimate of the camera pose. The three dimensional model of the scene is then updated based on data from the image and the estimated pose.

Another embodiment of the present invention is a method of accurately estimating a position of remote vehicle using a three dimensional model and an image from a camera having a known orientation relative to the remote vehicle. The image is compared to the three dimensional model of the scene to generate an initial estimate of the pose. A set of relevant features of the three dimensional model are selected and matched to features of the image. Matching errors are then measured and used to update the estimate of the pose. The position of the remote vehicle is determined using the estimated pose and the orientation of the camera. The three dimensional model may then be updated based on data from the image and the estimate of the pose.

Yet another embodiment of the present invention is a method of refining a three dimensional model of a scene containing an object using a plurality of images of the scene. First, a first image and a second image are compared to the three dimensional model of the scene to generate first and second pose estimates. Then, the first image and the second image are compared to one another to generate relative pose constraints. The first pose and the second pose are updated based on these relative pose constraints. Two sets of relevant features of the three-dimensional model corresponding to the first pose and the second pose are selected. These sets of relevant features are then matched to features in the first and second images, and two sets of matching errors are measured. The position estimate of the object within the three-dimensional model is then updated to reduce the two sets of matching errors.

The present invention is also embodied in a method of creating a textured three-dimensional model of a scene using a plurality of images of the scene. First a polyhedral model the scene including a plurality of polygonal surfaces is created. Each polygonal surface in the polyhedral model is larger than a predetermined size. One polygonal surface is then separated into a plurality of portions. For a selected portion, a subset of images containing that portion of the polygonal surface is identified. The corresponding section of the selected image is then projected onto the selected portion of the polygonal surface in the textured three-dimensional model as a local color map.

The present invention is also embodied in a video flashlight method of creating a dynamic sequence of virtual images of a scene using a dynamically updated three dimensional model of the scene. The three dimensional model is updated using a video sequence of images of the scene as described with regard to the second embodiment of the present invention. Meanwhile a viewpoint of a virtual image is selected. The virtual image is then created by projecting the dynamic three-dimensional model onto the virtual viewpoint.

BRIEF DESCRIPTION OF THE FIGURES

FIG. 8 is a top plan drawing illustrating a remote vehicle with a mounted camera viewing the scene from FIG. 1.

FIG. 10 is a perspective drawing of a surface from FIG. 2 illustrating the separation of the surface into approximately equal sized portions used in an exemplary hybrid three dimensional model according to the present invention.

FIG. 12 is a perspective drawing of a scene illustrating an exemplary video flashlight method of the present invention.

DETAILED DESCRIPTION OF THE INVENTION

The present invention embodies systems and methods for processing one or more video streams, for the purposes of progressively constructing and refining a 3D-scene model, geolocating objects, and enhanced visualization of dynamic scenes. One embodiment of the present invention is a progressive strategy to model construction and refinement, starting with a coarse model and incrementally refining it with information derived from freely moving video cameras, thereby increasing the spatial fidelity and temporal currentness of the model.

Figure 1:
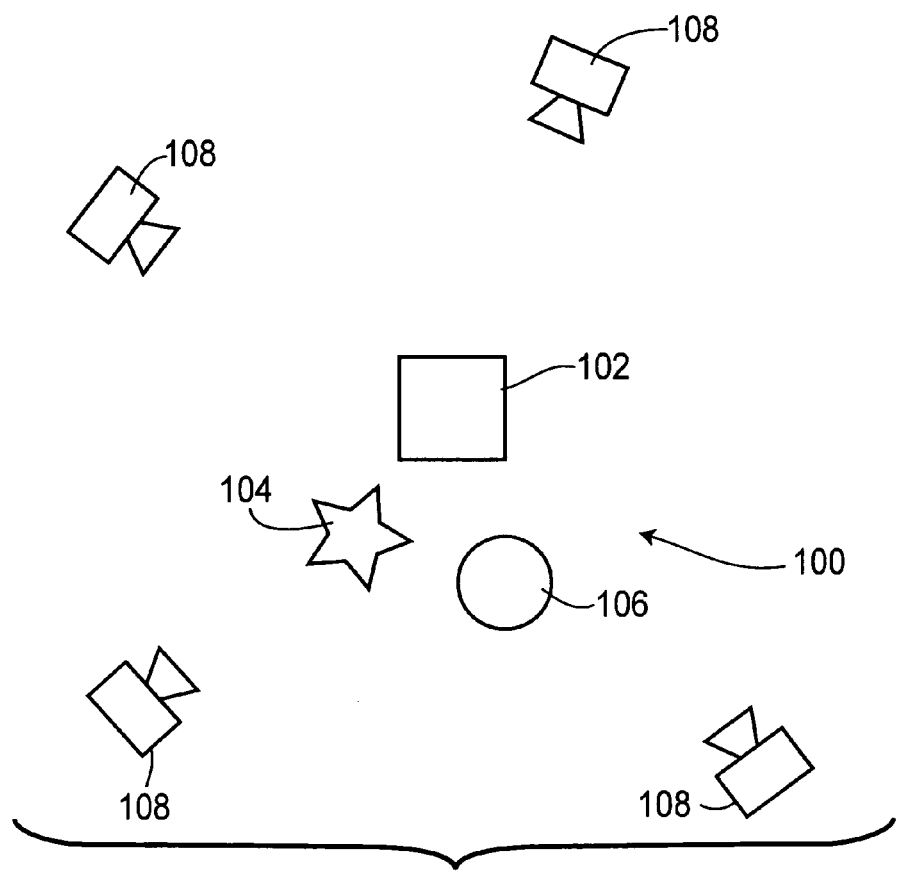
FIG. 1 is a top plan drawing of several cameras viewing a scene.

FIG. 1 is a top plan drawing showing several cameras 108, which may be stationary or may be in motion. The cameras view an exemplary scene 100, containing three objects, cube 102, star prism 104, and cylinder 106.

Figure 2:
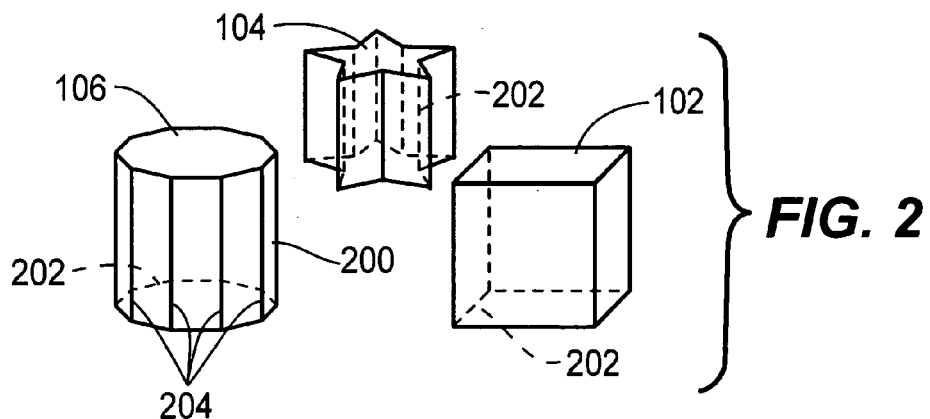
FIG. 2 is a perspective drawing of a polyhedral model of the scene in FIG. 1.

FIG. 2 is a perspective drawing of an exemplary polyhedral model of scene 100 from FIG. 1. All objects in this model are all represented as polyhedra composed of planar polygonal surfaces 200, even a curved object, such as cylinder 106. To accomplish such a polyhedral representation, the modeled representation of cylinder 106 contains artificial edge boundaries 204. Also shown in FIG. 2 are dotted lines 202, which represent edge boundaries that are hidden in the illustrated view of the model. While this model is shown as an image of a physical scene, it is contemplated that the model may be a mathematical representation of the scene, stored in a data file.

A first exemplary embodiment of the present invention is a method of automatic pose estimation and registration of video to an existing polyhedral scene model, which may or may not have texture information suitable for registration. The method of this embodiment may be used to estimate camera pose with respect to textured or untextured models, by optimizing the fit between line segments projected from model to image and the gradients of image intensity. This method may be combined with interframe prediction to continuously track a video stream.

Figure 4:
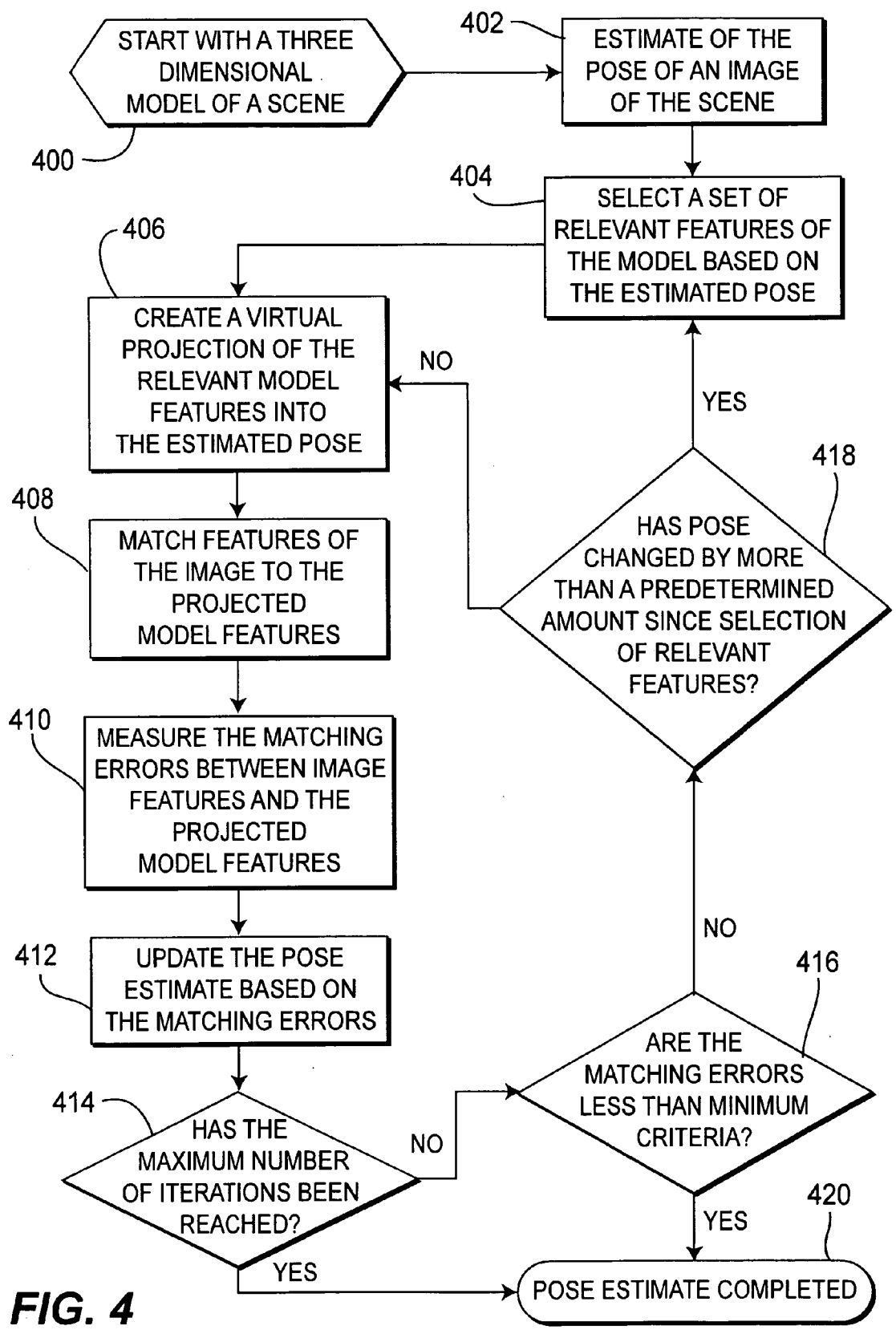
FIG. 4 is a flowchart illustrating an embodiment of the present invention to accurately estimate the pose of an image of a scene using a three dimensional model of the scene.

FIG. 4 is a flowchart illustrating this exemplary embodiment of the present invention. The method begins with a three dimensional model of the scene, 400, such as that shown in FIG. 2. The first step, 402, is to generate an initial, rough estimate of the pose of an image by comparing the image to the three dimension model of the scene. Numerous methods may be used to obtain this initial estimate. In an interactive system, a user can set the pose for the first frame. Physical measurements from position/attitude sensors mounted on the camera platform may be another source. Alternatively, when processing a sequence of frames, the estimated pose of the previous frame may be used as the initial pose, or the pose can be predicted from the previous frame's estimated pose based on assumed motion. Interframe alignment may also be used to assist with prediction and with overcoming ambiguity. One method for determining an initial pose estimate may be to extract corresponding 2D feature points from a pair of successive images using an optical flow technique. In order to support large displacements, flow estimation may be initialized with the 2D projective motion field estimated by a global parametric motion algorithm. Methods for flow estimation of this type are described in U.S. Pat. No. 5,629,988, entitled "SYSTEM AND METHOD FOR ELECTRONIC IMAGE STABILIZATION". Next, each selected feature point is mapped into its corresponding 3D point in the world view by using the current estimated pose and the current shape model. The initial pose estimate is then determined from the set of 3D and 2D correspondences. This may be done, for example, using the Random Sample Consensus (RANSAC) method of robust least squares fitting. Even though the current pose and shape model may include significant errors, these errors should be reduced in the process of refining the image to model alignment.

Next a set of relevant features is selected from the three dimensional model based on the estimate of the pose, step 404. The existing model may be considered a collection of untextured polygonal faces. Face edges in the model imply discontinuities in surface normal and/or material properties in the actual 3D scene, which generally induce brightness edges in an image. Although the subject invention is described in terms of brightness edges, it is contemplated that other types of edges may be used such as those defined by changes in color or texture on an appropriately colored and/or textured model. Because they are relatively easy to identify, an exemplary alignment method selects 3D line segments from the model as relevant features.

Figure 3:
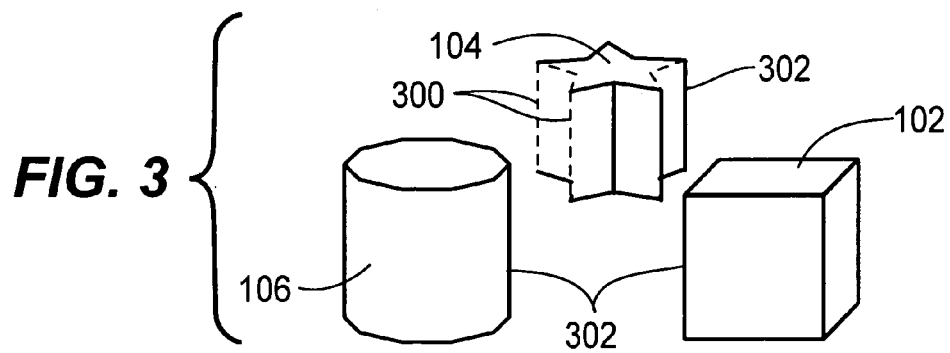
FIG. 3 is a drawing illustrating selection of relevant features from the polyhedral model of FIG. 2.

FIG. 3 is a drawing illustrating selection of relevant features 302 from the polyhedral model of FIG. 2. FIG. 3 is drawn to have the same pose as that used for the perspective drawing of FIG. 2. Given an initial pose estimate, occluded fragments of model features, dotted lines 202 in FIG. 2, may be deleted by known methods, such as a Z-buffer hidden line removal process.

Because many models of objects, such as buildings, may be constructed for various applications besides pose estimation (e.g. architecture), many model edges will not induce brightness edges in the image. Even after occluded edge fragments are suppressed, a model may contain clutter such as edges occluded by unmodeled objects, edges of structures that are semantically but not geometrically significant, edges between faces meeting at a shallow angle. Pose estimation may be adversely affected if too much model clutter happens to fall close to image edges. Therefore, it is important to cull the edges of the polyhedral model to keep those most likely to induce brightness edges.

Additionally, multiple local minima in pose estimation may be caused by closely spaced edges in either the model or the image even if they correspond to brightness edges in the image. Therefore, once the possible relevant features of the model have been identified, a projection of these features as they appear in the estimated pose is created, step 406 in FIG. 4, and projected model features are culled out if any similarly oriented projected model edge lies near it. Projected model features may also be culled if image texture analysis reveals the presence of multiple image edges within a predetermined distance. This culling may be dynamically adapted to the current level of uncertainty, so that as pose becomes better known, more edges can be included for increased pose estimation accuracy.

Application-dependent heuristics for this culling may be applied, for example, keeping only model edges common to exactly two faces, keeping edges only at large dihedral angles, ignoring edges which are too close together, and ignoring edges near and on the ground (terrain faces may be annotated in the given model). In FIG. 3 the dotted lines 300 represent features which have been ignored in this exemplary pose as too close to other lines. Also missing are the artificial edge boundaries 204 from the model shown in FIG. 2, as the their dihedral angles have been determined to be too small.

While the pose, and hence occlusions, may change during the optimization process, it may suffice to cull model edges once when initializing the optimization and afterwards only if the pose changes significantly. This determination, based on the change in the estimated pose in the exemplary method of FIG. 4, is shown as step 418. If the pose of the camera has changed by more than a threshold amount since the features were selected from the model, step 418 jumps to step 404 to select a new set of features. The process of pose refinement desirably leads toward smaller changes in the estimated pose. Therefore, often the estimate of pose will quickly become approximately correct. In this instance, step 418 branches to step 406 and same set of relevant features will be used throughout the remaining pose refinement It is noted that, though the embodiments of the present invention mostly disclose the measurement and reduction of matching errors, one of skill in the art may easily practice the present invention by, instead, measuring and increasing matching scores without substantially altering the invention.

Next, the virtual projection of the relevant features is matched to brightness features in the image, step 408. Additionally, color and/or texture edges may be used to generate image features, not just brightness edges. Matching errors are generated to indicate the goodness of the fit, step 410. The estimated pose is then updated based on these matching errors, step 412. The matching error calculation may be accomplished by many methods, including a number of image processing methods used for image warping and mosaic construction.

In the case of an already-textured model, constructed from a previous set of images, the matching of image intensity patterns in the image to the textured model may be accomplished following the teachings of U.S. patent application Ser. No. 09/075,462, entitled "METHOD AND APPARATUS FOR PERFORMING GEO-SPATIAL REGISTRATION" and U.S. Provisional Application No. 60/141,460, entitled "GEOSPATIAL REGISTRATION USING EUCLIDEAN REPRESENTATION".

One difficulty that may arise is that an image may have brightness edges that are close together, causing local minima in the objective function. Also, if the given polyhedral model does not agree with veridical scene structure, no pose can simultaneously align all edge features well. Projected model features may get stuck at the wrong image edge, preventing progress towards the correct pose.

Several approaches to mitigate this problem exist. One exemplary method is to use any of a number of discrete search schemes. Perturbing the pose estimate, either at the initial estimate, step 402, or during refinement, step 412, is one method that may increase the likelihood of finding the global minimum. These perturbations in pose estimate may be generated by explicitly perturbing the pose parameters. Alternatively, they may be generated in a data-driven fashion, as in RANSAC, wherein pose hypotheses are estimated from many randomly chosen subsets of the model features.

For video sequences, interframe registration may be used to yield constraints on relative poses of neighboring frames, which, in turn, may allow poses of a collection of frames to be determined unambiguously. If a set of nearby frames collectively views a larger set of edges than any single frame, simultaneously exploiting image-to-model constraints in multiple frames may help to disambiguate pose. An exemplary embodiment of the present invention aligns the three dimensional model to a mosaic, virtual wide-angle image, from a virtual rigid rig of cameras. Suppose that a pose estimate has been predicted for one frame, but that this pose estimate is ambiguous due to a paucity of relevant model edges. For each of the remaining frames, interframe prediction may be used to obtain pose estimates. These pose estimates may then be treated as a virtual rigid rig of cameras. The total image-to-model error of the mosaic, virtual wide-angle image, created from these frames is then minimized. This method is particularly useful for scenes in which the features are relatively static.

Mismatched features may also occur because the attributes being measured are not sufficiently discriminating. For example, a projected model feature may be matched equally well to an image edge of equal length, an image edge of longer length, or a series of short image edges. Many different methods for matching image features tuned to scale and orientation are known in the art. One method that may be used is pyramid processing. Both the image and the model may be processed into a pyramid of resolution levels. As the estimated pose becomes more accurate (i.e. the matching errors decrease), the resolution level, and number of features retained, may be increased.

The matching errors may also be optimized with respect to the estimated pose via steepest descent. The natural representation of an infinitesimal change in the pose parameters as a translation and a cross product for small rotation, however, unweighted steepest descent tends to work slowly when the energy surface is highly anisotropic, and may get stuck in local minima. To solve this problem, the current pose estimate may be iteratively incremented by moving in the gradient direction in the space of an orthogonalized incremental pose parameter. In that space, a unit step in any direction causes the RMS change in line segment points of image features to be 1 pixel.

One of the properties that may be desirable for the matching errors is a degree of robustness against outliers. Desirably this robustness includes both poorly fitting lines and model clutter, i.e. a spurious model feature that has no true matching image feature. If the projected feature lies far from any image feature, it contributes little to the calculation of the gradient of estimated pose. To reduce the chance that a projected model line segment, whether an artifact of model clutter or a valid feature, would be attracted to a falsely matching image feature, dissimilarly oriented model and image edges may be ignored by using an oriented energy image tuned to the angle of the model line.

Many different methods for generating a measure of local edge strength within an image tuned to scale and orientation are known. In an embodiment of the present invention, an oriented energy image including the oriented energy at a selected angle may be computed as follows. The source image is differentiated in the selected direction and smoothed in a perpendicular direction. The magnitude of the latter is smoothed in the selected direction. This method responds to both step edges and impulses. For computational efficiency, the orientation may be quantized to multiples of 45° and scaled to powers of 2, as in a pyramid.

Unfortunately, the robustness of this method may mean that, if the error in initial estimate of pose causes many model line segments to be projected far from their corresponding image features, the steepest descent may not move towards the true pose. An exemplary method to increase the capture range and speed convergence is to vary the scale of the energy image from coarse to fine resolution during the optimization process. The scale may desirably be tuned for each model line, commensurate with the expected amount of uncertainty in the location of predicted feature with respect to the actual corresponding image edge.

It has been found that the capture range of coarse-to-fine pose estimation may be reasonably large for low complexity images, and limited only by the presence of multiple local minima in matching errors when the image has lots of edges. Thus, it may be desirable to exploit interframe constraints to ensure stable tracking over a sequence, such as by using prediction to initialize estimated pose in the correct minimum basin, or by multiframe alignment. Intelligent selection of a subset of model features is also critical.

Also, the orientation tuning may be very broad in the oriented energy pyramid described above. The solution may be to add more discriminating feature attributes to the representation. The measure of the matching errors may be improved, for example, by using sharper orientation tuning.

Alternatively, in an outdoor site modeling application, the camera may only see a small part of the model at a time. Thus, there may be individual images that contain little texture or few model edges, so that matching features may be difficult and the pose may be undetermined. One method to overcome this difficulty is to combine several images to form a mosaic that is warped to the coordinate system of the current image. This composite image may be used in the algorithm, in place of the individual image, to determine the pose of the camera at the position of the current image.

The process of pose refinement shown in steps 406, 408, 410, and 412 may be repeated until a set number of iterations have occurred, step 414, or until the matching errors fall below a set criteria, step 416 (alternatively, the matching score, if used, may exceed a predetermined level).

Figure 5:
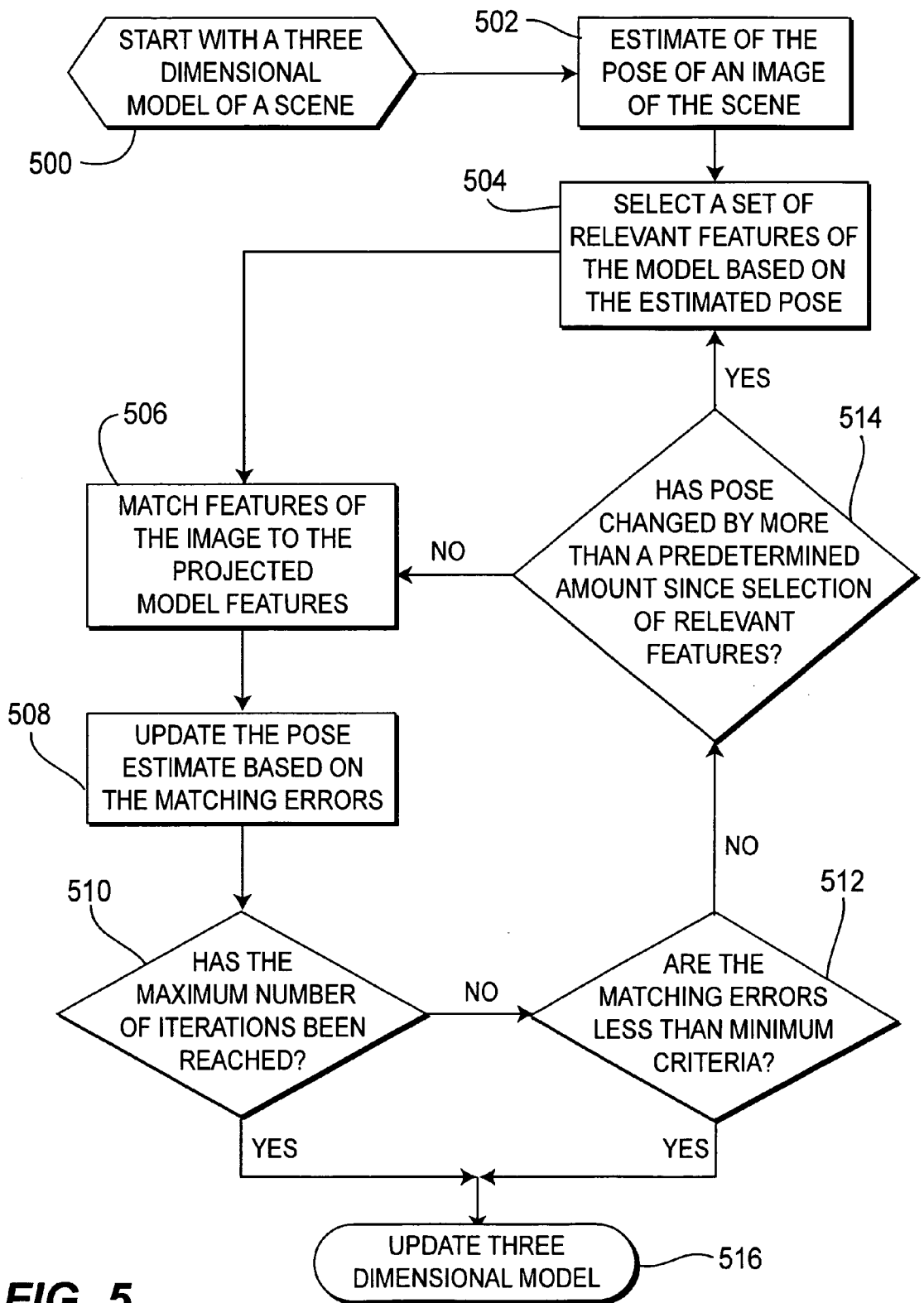
FIG. 5 is a flowchart illustrating an embodiment of the present invention to update a three dimensional model of a scene using an image of the scene with an unknown pose.

FIG. 5 is a flowchart illustrating an embodiment of the present invention to update a three dimensional model of a scene using an image of the scene with an unknown pose. This method begins with several steps that are similar to those described above with regard to FIG. 4. As in the exemplary embodiments described with regard to FIG. 4, the embodiment illustrating in FIG. 5 begins with a three dimensional model of the scene, 500. This starting model may be very rudimentary and limited in its scope. As images are aligned and information from these images used to update the model, the detail and range of the model may both be increased.

Still following the outline of FIG. 4, the image is compared to the three dimensional model of the scene to generate an initial estimate of the pose, step 502. A set of relevant features are selected from the three dimensional model based on this pose estimate, step 504. The relevant features of the model are then projected and matched to features in the image to generate matching errors, step 506. Next, the estimated pose is updated based on the matching errors, step 508. Once again as previously described, the pose refinement process, shown in FIG. 5 as steps 504, 506, and 508, may be repeated until a set number of iterations have occurred, step 510, or until the matching errors fall below a set criteria, step 512 (alternatively, if an embodiment employing a matching score is used, step 512 may query if the matching score exceeds a predetermined level).

Step 514 determines whether the pose estimate indicates that the pose of the camera has changed so much from the initial pose in which the current relevant features were selected that it may be desirable to reselect a new set of relevant model features to be used for continued pose refinement.

Figure 6:
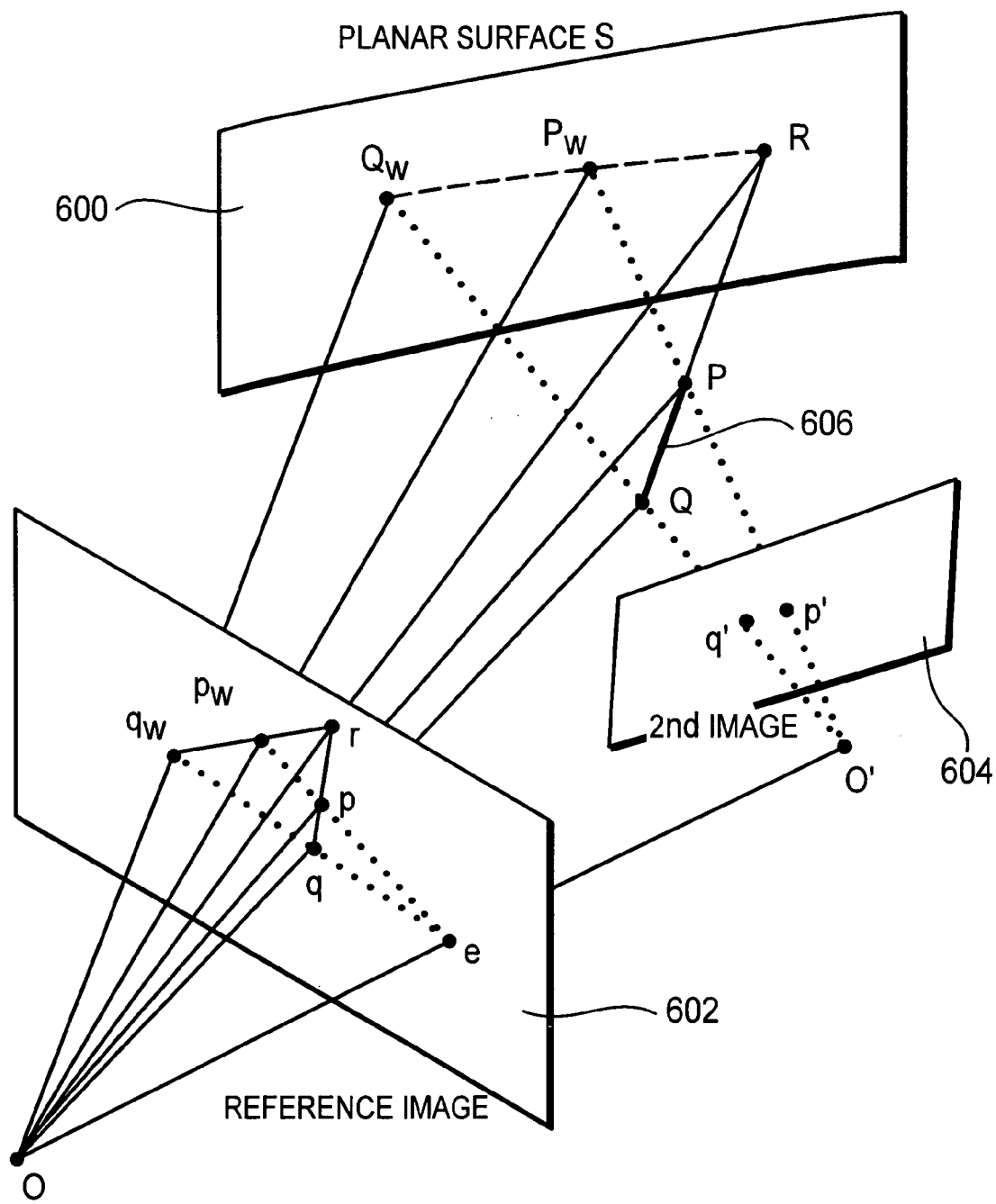
FIG. 6 is a perspective drawing illustrating the use of epipolar geometry to determine the relative pose of two images.

Once the pose estimate is completed, as evidenced by a 'yes' answer to the query of either step 510 or step 512, the data from the image is used to update the three dimensional model, step 516. This update may include: the refinement of object placement within the scene; the additions of textural or fine structural detail to surfaces of objects; temporal updating of dynamic processes, such as changing illumination, or objects in motion; and the spatial extension of the scene being modeled. A number of methods to project image data onto a corresponding three dimensional model, such as a simple ray tracing method, are known in the art and may be used in step 516. For many of these methods it is desirable to use two, or more, images simultaneously, particularly to assist with refining object placement and identifying objects in motion. FIG. 6 is a perspective drawing illustrating a plane in the scene, 600, and the poses of two images, 602 and 604, of the scene, both of which include object 606. Significant work has been done using the epipolar geometry shown in FIG. 6 for image processing and mosaic construction. In this Figure, the epipole is shown as the line O–O'. The epipolar geometry of a scene may also be used to place constraints on the relative pose of images 602 and 604 even if the location of object 606 within the scene is not known. Additionally, plane plus parallax methods may be used to generate relative pose constraints between images. A detailed discussion of some of these methods is provided in U.S. Pat. No. 6,192,145, entitled "METHOD AND APPARATUS FOR THREE-DIMENSIONAL SCENE PROCESSING USING PARALLAX GEOMETRY OF PAIRS OF POINTS".

Figure 7:
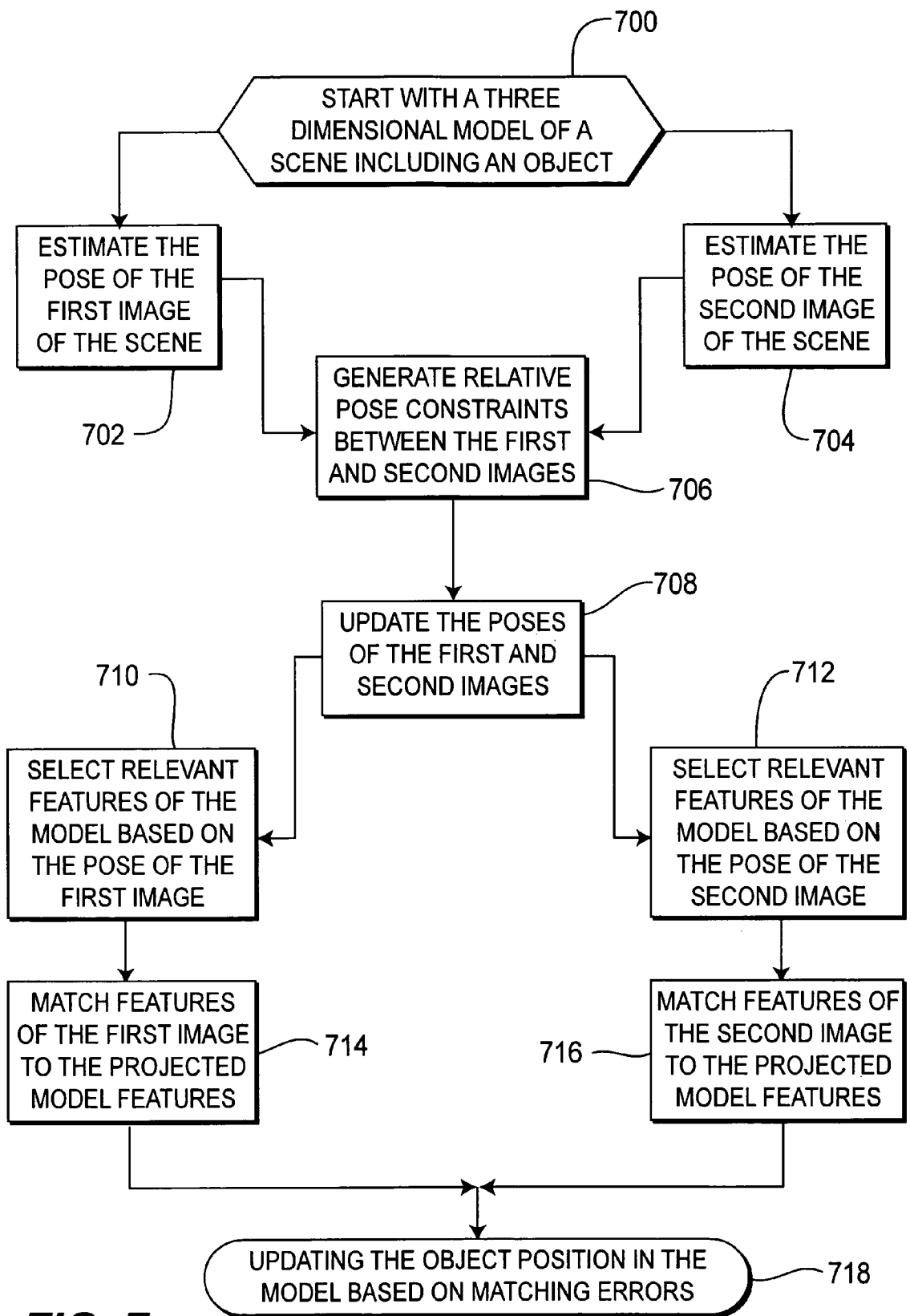
FIG. 7 is a flowchart illustrating an embodiment of the present invention to update a three dimensional model of a scene using a pair of images of the scene with unknown poses.

FIG. 7 is a flowchart illustrating another exemplary embodiment of the present invention. This exemplary method is similar to that previously described with regard to FIG. 5, but uses multiple images of the scene with unknown poses to update a three dimensional model of a scene. Although the exemplary method shown in FIG. 7 only employs two images at a time, it is contemplated that three or more images may be simultaneously used in this embodiment. The images may be successive images from a moving source, or they may be concurrently generated images from multiple sources. The parallel paths in FIG. 7, such as steps 702 and 704, represent parallel processes, which may occurs as multi-threaded tasks within the image processing hardware of the present invention. It may be desirable for these tasks to be performed concurrently by parallel processors to increase processing speed.

As in previously described embodiments of the present invention, this embodiment begins with a three dimension model of a scene, 700, and the first and second images are compared to the three dimensional model of the scene, steps 702 and 704 respectively, to generate pose estimates. These pose estimates may be initial pose estimates, or may be refined as described in previous embodiments of the present invention. If the pose estimated are refined, it may be desirable for the matching error criteria to be less precise than in previous embodiments.

Next, the first and second image are compared to one another, step 706, to generate constraints on the relative poses of the two images. A number of methods exist to generate relative pose constraints as described above with respect to FIG. 6, such as optical flow, RANSAC, epipolar geometry calculations, and plane plus parallax. Relative pose constraints can also be generated due to the known motion of a single camera, or known spatial relationships between multiple cameras. The pose estimates are then updated to accommodate the relative pose constraints, step 708. While it is often desirable to minimize the individual image to model mismatches when the pose estimates are being updated, this update should result in pose estimates that fit within the relative pose constraints generated in step 706.

Next, sets of relevant features from the three dimensional model, corresponding to the first image and the second image, are selected based on the updated poses, steps 710 and 712 respectively. These sets of relevant features may be selected by any of the previously disclosed methods. The corresponding set of relevant features is next projected to the estimated pose of the first image, matched to the first image and first image matching errors are measured, step 714. The same procedure is followed for the second image in step 716.

The three dimensional model is updated using the matching errors from both images to improve the position estimate of objects within the model, step 718. The matching errors are jointly minimized with respect to position estimate for both images to refine the placement of known objects in the scene model. Further iterations may be used to improve the model refinement, and possibly the estimated camera poses as well. These iterations may start by once again estimating the image poses, steps 702 and 704, or with the selection of sets of relevant model features, steps 710 and 712.

The use of more than two images at a time may also increase the accuracy of object placement. To help overcome errors in estimating object placement when the estimates of camera pose are inaccurate, or vice versa, parameters may be estimated jointly in multiple frames, akin to bundle adjustment in structure from motion. For further stability, inconsistency of poses with respect to interframe alignments should also be penalized, e.g. uncertainties in the relative pose constraints of corresponding points in frame pairs may be used to weight the importance of matching errors for various images.

This is a 3D generalization of the method disclosed in U.S. Pat. No. 6,078,701, entitled "METHOD AND APPARATUS FOR PERFORMING LOCAL TO GLOBAL MULTI-FRAME ALIGNMENT TO CONSTRUCT MOSAIC IMAGES".

In addition, refinement of object placement may be extended to more general deformations by using an additional set of parameters to describe known sizes and relationships of parts of objects.

Figure 9:
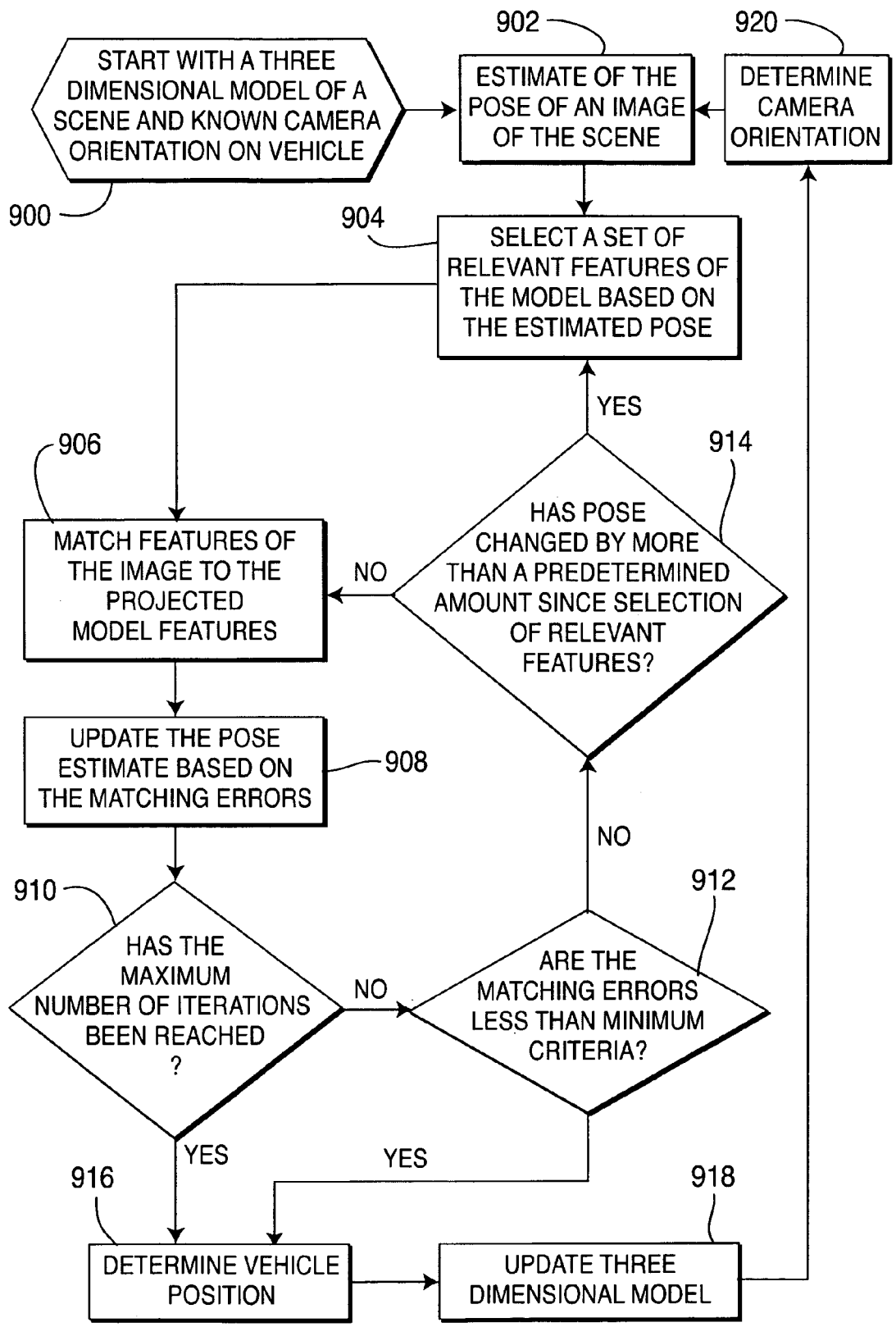
FIG. 9 is a flowchart illustrating an embodiment of the present invention to accurately estimate the position of a remote vehicle within a scene using a three dimensional model of the scene and an image of the scene.

One possible use of the present invention is illustrated in FIGS. 8 and 9. This application of the present invention involves using current video from a camera mounted on a remote vehicle to locate the vehicle relative to objects in a three dimensional model. An additional application for the present invention may be to extend and refine a three dimensional model of an area as the area is explored by the remote vehicle possibly beyond the range of the scene originally covered by the model. Numerous applications in robotics exist for such methods. These methods may be particularly useful for the exploration of places in which other location techniques, such as GPS, are not practical, including underground, deep-sea, and interplanetary exploration.

FIG. 8 is a top plan drawing of remote vehicle 800, with mounted camera 802, viewing the scene from FIG. 1. In this exemplary sketch, the camera is turned so that at least a portion of each object in the scene, cube 102, star prism 104, and cylinder 106, is visible (shown as surfaces 804). Although both the remote vehicle and the camera may be independently moveable, the position and angular orientation of camera 802 relative to remote vehicle 800 are assumed to be known, or at least measurable.

FIG. 9 is a flowchart illustrating an exemplary embodiment of the present invention to accurately estimate the position of a remote vehicle within a scene using a three dimensional model of the scene and an image of the scene. As previously described, the method begins with a three dimension model and an image from a camera having an orientation relative to the remote vehicle, 900 that can be determined. The next seven steps, 902, 904, 906, 908, 910, 912, and 914, involve estimating and refining the camera pose with respect to the three dimensional model. These steps are the same as steps 502, 504, 506, 508, 510, 512, and 514 in the flowchart of FIG. 5.

Once the pose of the camera mounted on the vehicle has been accurately estimated with respect to the scene, the position and orientation of the remote vehicle relative to the scene in the three dimensional model may be determined, step 916. Because the mounted camera may be adjusted to rotate, tilt or zoom, parameters controlling these functions may need to be examined to determine the orientation of the camera relative to the remote vehicle.

The pose of the camera may be used independently of the position and orientation of the vehicle to update the model. At step 918, the three dimensional model is updated based on data from the image and its estimated pose, step 918, similarly to step 516 in FIG. 5. Finally, the camera orientation, and possibly its position, relative to the remote vehicle are determined, step 920 to fix the position of the vehicle. The process begins again at step 902 when another image is taken.

In addition to the large-scale model refinement of object placement previously discussed with regard to FIG. 7, an exemplary embodiment of the present invention may be used for detailed refinement of a three dimensional model, including definition of local surface shape and texture. The true shape of the surfaces in the scene may differ from the planar surfaces given by the given polyhedral model, even after refinement of object placement. For example, between the time of model construction and acquisition of the current video, the existing objects may have changed, and objects may be added or deleted. Some scene objects, especially natural objects like trees, may be absent from the model, or unsatisfactorily represented, because they are hard to represent using simple polyhedra. This can be clearly seen for the polyhedral model of cylinder 106 in FIG. 2.

In another exemplary embodiment of the present invention, an untextured model, such as the previous mentioned polyhedral model, may be populated with pixels from a series of images of the scene, such as video sequences, using the estimated camera poses and corresponding estimated object placements. The brightness of an object in the scene may be approximated as being constant, independent of the viewpoint, and each surface pixel may be assigned a color value that is most typical of all the given images.

As part of this embodiment polygonal surfaces of a polyhedral three-dimensional model may be separated into approximately equally sized portions. This may allow for better mapping of surface detail from a series of images onto the model, particularly for surfaces that are only partially visible in some of the images. FIG. 10 shows a perspective drawing of surface 200, from FIG. 2, which has been separated into approximately equal sized portions 1000. Surface detail 1002 for one portion, which may be added to the polyhedral model, is also shown. By adding surface detail to a polyhedral model of the scene in this manner, a hybrid three-dimensional model of the scene may be created.

Figure 11:
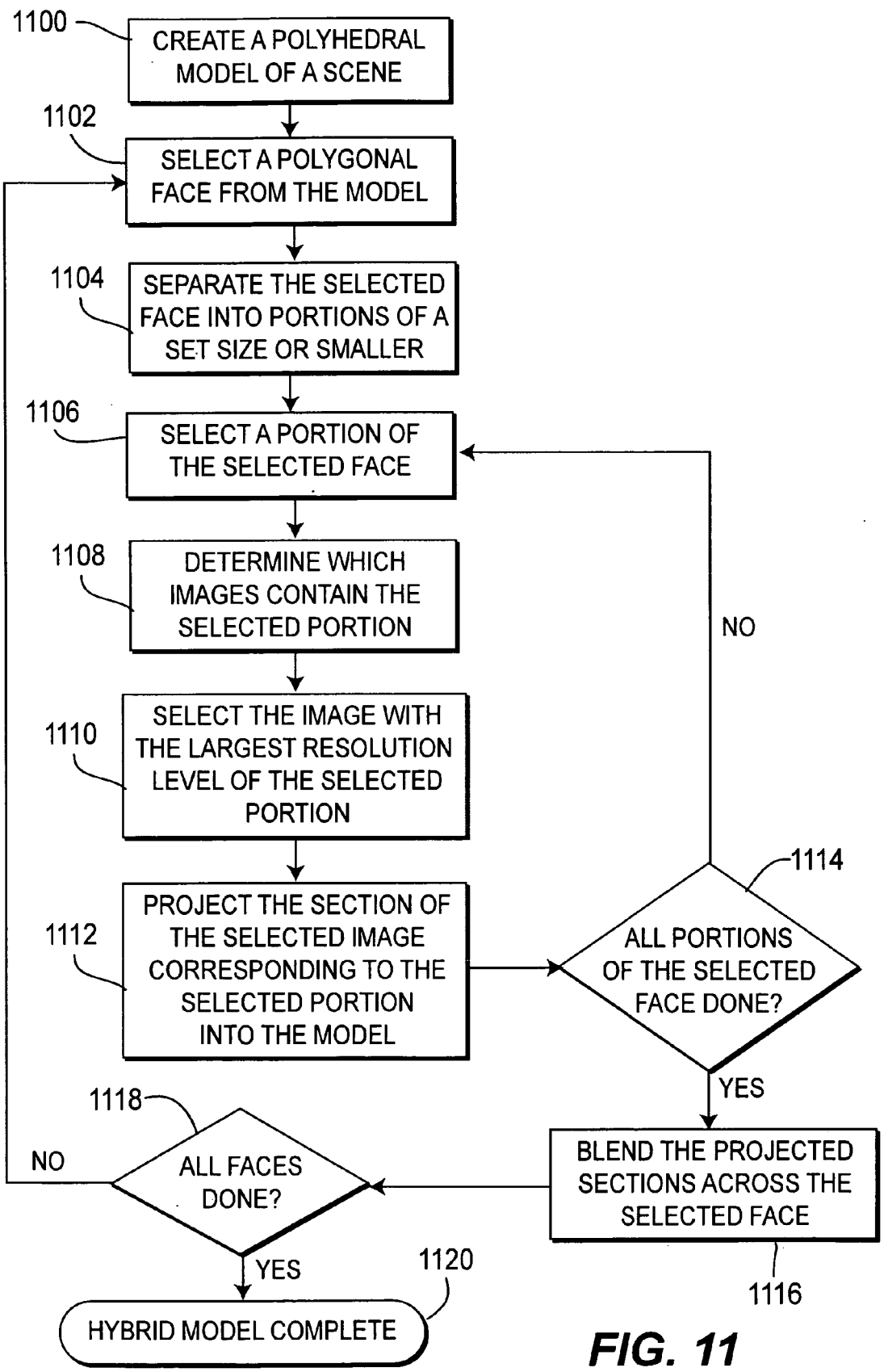
FIG. 11 is a flowchart illustrating an embodiment of the present invention to create a hybrid three-dimensional model of a scene.

FIG. 11 is a flowchart illustrating an exemplary embodiment of the present invention to create such a hybrid three dimensional model of a scene using a series of images of the scene. The first step is to create a polyhedral model the scene, step 1100. The polyhedral model desirably includes a plurality of polygonal surfaces, which are larger than a predetermined size for surface portions. Any standard technique for creating the model may be used. The rough shape and placement of objects in the polyhedral model may be refined according to the techniques of either of the flowcharts in FIGS. 5 and 7 using previous, possibly low resolution, images of the scene and/or the series of images to be employed for adding surface detail to the model. It is also important to determine the camera poses of the series of images. The poses may be known, or may be determined by one of the methods described above.

Next a polygonal face is selected from the polyhedral model for determination of surface details, step 1102. The selection may be predetermined to sweep the analysis from one side of the model to its opposite side, or it may be based on a determination of scene areas in the images where the modeled shape appears to differ significantly from the existing model. The latter selection method is most useful when refinement of surface details is desirably to be performed only in those areas of the model that deviate from the images by an amount greater than a certain threshold.

At this point, it may be desirable to estimate and represent a refined surface shape as a height map associated with the selected planar surface. Given the previously determined camera poses, these height maps may be estimated by dense 3D estimation techniques from two or more observed images. The outcome of this process is a hybrid shape representation that augments the polyhedral model with local shape variation.

Several relevant techniques are previously disclosed: U.S. Pat. No. 5,963,664, entitled "METHOD AND SYSTEM FOR IMAGE COMBINATION USING A PARALLAX BASED TECHNIQUE", U.S. Pat. No. 5,259,040, entitled "METHOD FOR DETERMINING SENSOR MOTION AND SCENE STRUCTURE AND IMAGE PROCESSING SYSTEM THEREFORE", and U.S. patent application Ser. No. 09/384,118, entitled "METHOD AND APPARATUS FOR PROCESSING IMAGES ". First, a batch of images is co-registered using the previously determined poses and shape model. Next, using change detection, regions are segmented out where the image alignment is consistently incorrect. In the detected change regions, the residual misalignment may be estimated, i.e. flow constrained along the epipolar lines. By progressing from coarse to fine image scale, such an estimation algorithm can handle a large amount of parallax, which may occur in areas of significant discrepancy between the given shape model and the actual 3D structure of the scene. Finally, the last step is to convert the resulting parallax magnitude to metric height.

In the cited patents and applications, it is recommended to sum up the image intensity errors over all pixels, between each inspection frame and a single designated reference frame. However, if the batch contains frames taken from widely disparate viewpoints, the appearance change may be large even if well aligned. Therefore, it may be desirable to sum up intensity errors only between adjacent images, or consecutive frames, if the series of images are a video sequence. A larger subset of images, or frames, may also be used, but it is often desirable for this subset to be selected to have viewpoints within a predetermined range.

If the batch of images used in the foregoing computation covers a sufficiently large range of views, the estimated shape may be very accurate; however, occlusion and deocclusion areas cannot be well represented using a depth map with respect to one reference view. In practice, a smaller batch of images may produce a shape estimate good enough to align and synthesize viewpoints in the vicinity of the source data. It is contemplated that an alternative may be to use the parallax estimation methods to independently estimate and represent shape within a series of overlapping batches of images, each with its own reference view. Each such estimate would be stored in a hybrid scene representation consisting of a polyhedral model plus view-dependent local shape variations.

Whether a height map of the local surface shape has been constructed or not, a separate texture map is next constructed for each polyhedral face in the model. The local height map may assist in this construction, but is not a necessary step. The first step of this process, step 1104 in FIG. 11, is to separate the selected polygonal surface into portions of approximately the predetermined size for surface portions. This predetermined size may be as small as a single element within the model, or it may be as large as the entire polygonal surface. Next one of these portions is selected, step 1106. Z-buffering may be used to detect and discard those images which are occluded by some other face, leaving a subset of images which contain the selected surface portion, step 1108.

To determine the color value for a portion X on the surface, X is mapped to every image in the subset, using object placement parameters for the surface, camera pose parameters and, if available, the previously estimated height maps. One method, possibly the simplest, is to combine the color values from the pixels in the subset of images corresponding to X. This may be done by averaging the color values, blending the color values or performing another mathematical function on the color values of the various images in the subset.

These methods of combining the color values ignore the possibly unequal quality of the images. The highest resolution, and most frontal view, of the face gives the most information about the surface appearance. Image resolution (e.g. in pixels/meter) can be assessed by the smaller singular value, $\mu$, of the Jacobian $dU_i/dX_j$, where $X_i$ is measured in a 2D face-aligned coordinate system and $U_i$ is the position in the $i^{th}$ image corresponding to X. Thus, the image having the maximum value of $\mu$ may be selected at step 1110, and its color value(s) projected from pixel(s) $U_i$ to portion X, step 1112.

The color and brightness at corresponding points in different images may not be identical, due to camera gain variations and non-Lambertian surface materials. Abruptly switching between different source images while computing the appearance of a single face may cause seams to appear in the texture map. Accordingly, it may be desirable to use pixel values from a single image to map texture onto a given surface of the model, if possible.

Alternatively, once it has been determined that all of the portions of a given surface have been mapped, step 1114, any artifacts caused by using multiple images to generate the texture maps of the portions of a single surface may be mitigated through multi-resolution blending of the portions, step 1116, as taught in U.S. Pat. No. 6,075,905, entitled "METHOD AND APPARATUS FOR MOSAIC IMAGE CONSTRUCTION". This step may also be employed when a single image is used to map texture onto all of the portions of a given surface of the model.

The foregoing method to create a surface texture map of a hybrid three dimensional model may be used whether the scene is initially modeled by planar faces alone or by a model of planar faces plus shape variations. In the generalized representation using view-dependent local shape, texture may be recovered for each local reference view. The result would be a 3D-scene model with view-dependent shape and texture.

One exemplary method to synthesize a new image from a novel viewpoint may be to interpolate the shape and texture of two or more nearby reference views closest to the desired viewpoint, according to the teachings of U.S. patent application Ser. No. 08/917,402, entitled "METHOD AND SYSTEM FOR RENDERING AND COMBINING IMAGES TO FORM A SYNTHESIZED VIEW OF A SCENE CONTAINING IMAGE INFORMATION FROM A SECOND IMAGE".

FIG. 12 is a perspective drawing of a scene, 1200, illustrating an exemplary video flashlights method of the present invention, which may be employed to synthesize an image from a novel viewpoint using a dynamic three dimensional model, such as those previously described with regard to the flowcharts of FIGS. 5, 7, and 11. The exemplary scene, 1200, is being filmed by video cameras 1202, which may be in motion. At any given time, images from these cameras contain only a portion of the scene, 1204.

It has been previously demonstrated that current video images of a semi-urban environment can be aligned in near real-time to site models. The textured models can then be rendered using graphics pipeline processors. A visual metaphor for this process of combining models with videos is that of video flashlights 'illuminating' portions 1204 of the model. The multiple camera views at a given time instant may be considered as video flashlights capturing the appearance of the scene from their respective viewpoints. The multiple appearances are coherently combined with the model to provide multiple users the ability to navigate through the environment while viewing the current appearance as derived from the video flashlights.

Figure 13:
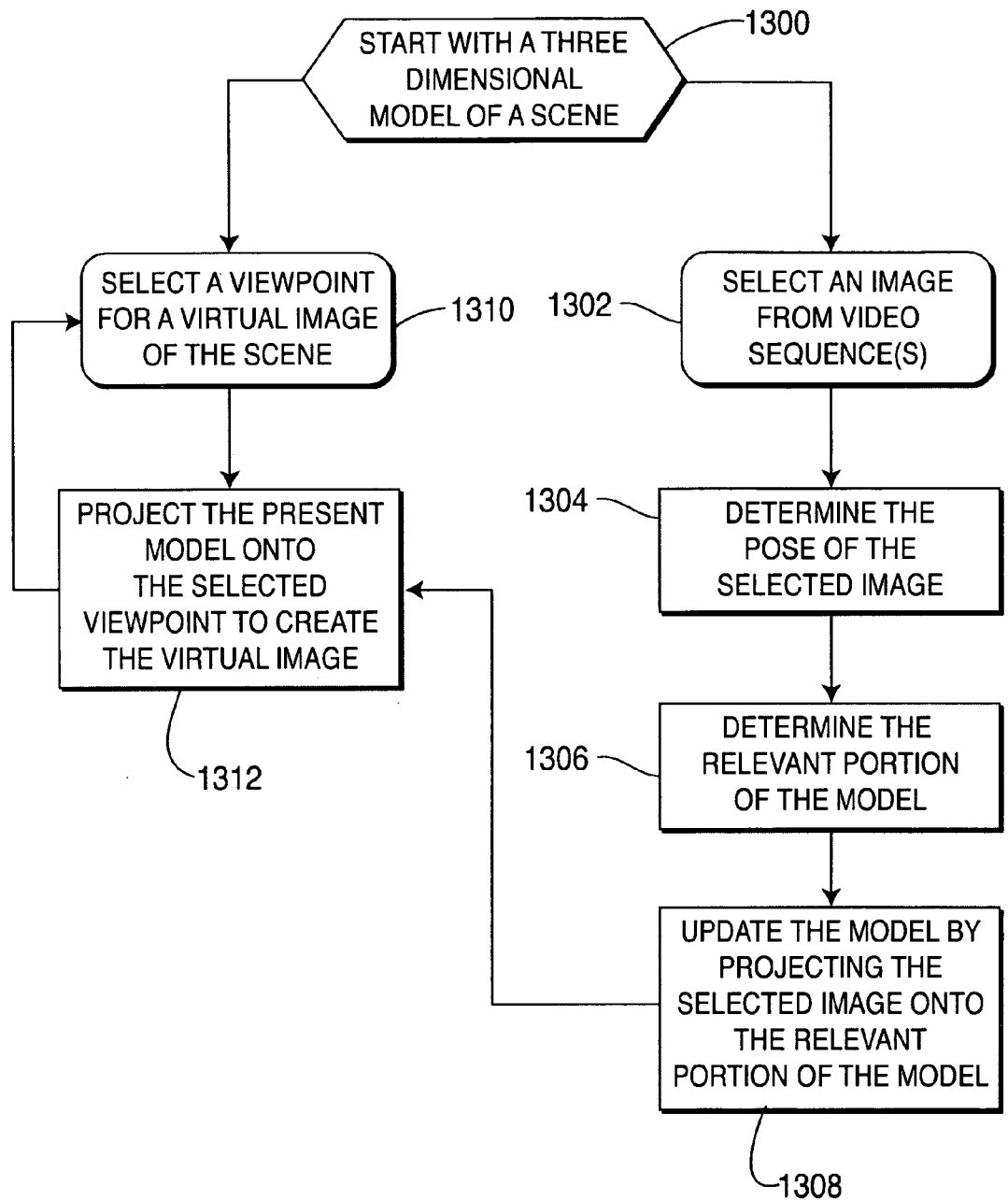
FIG. 13 is a flowchart illustrating an embodiment of the present invention to create virtual images of a scene and a dynamic three-dimensional model of the scene using a video flashlight method.

FIG. 13 is a flowchart illustrating an exemplary embodiment of the present invention to create virtual images of a scene and a dynamic three-dimensional model of the scene using this video flashlight method.

This exemplary method involves two concurrent processes. Both of these processes start from a preexisting three dimensional model of the scene, 1300. The first of these processes, updating the model using the incoming video data, is exemplified in FIG. 13 as steps 1302, 1304, 1306 and 1308. Any of the methods previously described above for updating a three dimensional model may be used. This dynamic updating process is continuous, so that the model may contain the most currently available data.

The second process is the creation of output image sequence(s) based on the dynamic three-dimensional model. This process involves the selection of a virtual viewpoint, step 1310, and projection of the current model onto the selected viewpoint, step 1312. The viewpoint selection may be controlled manually, set to track a feature, or object, in the model, or may follow a predetermined pattern. Projection of a three dimensional model to form an image as seen from selected point may be performed by a number of well known methods, such as Z-buffering.

Surveillance provides one possible application of this embodiment of the present invention. In a surveillance application using simultaneously deployed moving cameras, it may be difficult for a human operator to fuse and interpret real-time video streams displayed on separate viewing screens. The relationship of the streams to the larger environment is not evident from the images, which may be unstable and narrow in field of view. Ideally, a visualization should portray the world as if the user were actually looking at the live scene, decoupled from the paths of the cameras that are collecting the imagery.

An exemplary embodiment of the present invention registers all video frames to the model so that images from several cameras at the same time instant can be projected onto the model, like flashlights illuminating the scene, which may then be rendered for any user-selected viewpoint. In this context of the scene model, it may become easy to interpret the imagery and the dynamic events taking place in all streams at once.

It is contemplated that the three dimensional model may be constructed to be devoid of moving objects and/or objects that are difficult to model onto polyhedra. These objects may appear in the video flashlights. In a virtual imaging system of this design, it may be desirable to make control of the video flashlight(s) responsive to movement of the virtual viewpoint(s).

Additionally, it is contemplated that the methods previously described may be carried out within a general purpose computer system instructed to perform these functions by means of a computer-readable medium. Such computer-readable media include; integrated circuits, magnetic and optical storage media, as well as audio-frequency, radio frequency, and optical carrier waves.

The embodiments of the present invention have been described with regard to polyhedral and hybrid three-dimensional models since they are appropriate for urban scenes dominated by planar structures, a present domain of application. Also, this format is well supported by software tools and graphics hardware. It is understood that those skilled in the art may find it advantageous to use other three dimensional models with these methods. Such use does not depart from the scope of the present invention. In the same vein, it will be understood by those skilled in the art that many modifications and variations may be made to the foregoing preferred embodiment without substantially altering the invention.

What is claimed is:

1. A method for accurately estimating a pose of a camera within a scene using a three dimension model of the scene, comprising the steps of:
    (a) generating an initial estimate of the pose;
    (b) selecting a set of relevant features of the three dimensional model based on the initial estimate of the pose, the relevant features representing discontinuities in at least one of a surface normal or material properties in the scene;
    (c) creating a virtual projection of the set of relevant features responsive to the initial estimate of the pose;
    (d) matching a plurality of features of an image received from the camera to the virtual projection of the set of relevant features and measuring a plurality of matching errors; and
    (e) updating the estimate of the pose to reduce the plurality of matching errors.

2. The method for claim 1, further comprising the step of:
    (f) repeating to steps (c), (d), and (e) using the updated estimate of the pose until the plurality of matching errors are less than predetermined matching criteria.

3. The method of claim 1, further comprising the steps of:
    (f) adding the updates to the estimate of the pose made in step (e) to a total change value of the estimate of the pose;
    (g) if the total change value is less than predetermined pose change criteria, resetting the total change value and repeating to steps (b), (c), (d), (e) and (f) using the updated estimate of the pose; and
    (h) repeating to steps (c), (d), (e), (f) and (g) using the updated estimate of the pose until the plurality of matching errors are less than predetermined matching criteria.

4. The method of claim 1, wherein step (a) includes the step of comparing an image received from the camera to the three dimensional model of the scene to generate the estimate of the pose.

5. The method of claim 1, wherein step (a) includes the step of using a preceding pose estimate of a preceding image received from the camera to generate the estimate of the pose.

6. The method of claim 1, wherein step (b) includes the steps of:
    (b1) Z-buffering the three dimensional model based on the estimated pose to determine a set of visible features of the three dimensional model; and
    (b2) selecting the set of relevant features from the set of visible features.

7. A method for accurately estimating a pose of a camera within a scene using a three dimension model of the scene, comprising the steps of:
    (a) generating an initial estimate of the pose;
    (b) selecting a set of relevant features of the three dimensional model based on the initial estimate of the pose including the steps of
        (b1) creating a set of features of the three dimensional model including a plurality of edges of at least one object represented in the three dimensional model, each edge having a dihedral angle of greater than a predetermined angle; and
        (b2) selecting the set of relevant features from the set of features of the three dimensional model.
    (c) creating a virtual projection of the set of relevant features responsive to the initial estimate of the pose;
    (d) matching a plurality of features of an image received from the camera to the virtual projection of the set of relevant features and measuring a plurality of matching errors; and
    (e) updating the estimate of the pose to reduce the plurality of matching errors.

8. A method for accurately estimating a pose of a camera within a scene using a three dimension model of the scene, comprising the steps of:
    (a) generating an initial estimate of the pose;
    (b) selecting a set of relevant features of the three dimensional model based on the initial estimate of the pose;
    (c) creating a virtual projection of the set of relevant features responsive to the initial estimate of the pose including the step of removing a model feature from the set of relevant features if the model feature is less than a predetermined distance from a remaining relevant feature in the virtual projection.
    (d) matching a plurality of features of an image received from the camera to the virtual projection of the set of relevant features and measuring a plurality of matching errors; and
    (e) updating the estimate of the pose to reduce the plurality of matching errors.

9. A method for accurately estimating a pose of a camera within a scene using a three dimension model of the scene, comprising the steps of:
 (a) generating an initial estimate of the pose;
 (b) selecting a set of relevant features of the three dimensional model based on the initial estimate of the pose;
 (c) creating a virtual projection of the set of relevant features responsive to the initial estimate of the pose;
 (d) matching a plurality of features of an image received from the camera to the virtual projection of the set of relevant features and measuring a plurality of matching errors;
 (e) updating the estimate of the pose to reduce the plurality of matching errors; and
 (f) perturbing the estimate of the pose and repeating to steps (c), (d), and (e) using the perturbed estimate of the pose until the plurality of matching errors are less than predetermined matching criteria.

10. A method for accurately estimating a pose of a camera within a scene using a three dimension model of the scene, comprising the steps of:
 (a) generating an initial estimate of the pose;
 (b) selecting a set of relevant features of the three dimensional model based on the initial estimate of the pose, the relevant features representing discontinuities in at least one of a surface normal or material properties in the scene;
 (c) creating a virtual projection of the set of relevant features responsive to the initial estimate of the pose;
 (d) matching a plurality of features of an image received from the camera to the virtual projection of the set of relevant features and measuring a plurality of matching errors including the steps of:
  (d1) computing an oriented energy image of the image received from the camera; and
  (d2) integrating the oriented energy image along the virtual projection of the set of relevant features and measuring the plurality of matching errors; and
 (e) updating the estimate of the pose to reduce the plurality of matching errors.

11. A method for accurately estimating a pose of a camera within a scene using a three dimension model of the scene, comprising the steps of:
 (a) generating an initial estimate of the pose;
 (b) selecting a set of relevant features of the three dimensional model based on the initial estimate of the pose;
 (c) creating a virtual projection of the set of relevant features responsive to the initial estimate of the pose;
 (d) matching a plurality of features of an image received from the camera to the virtual projection of the set of relevant features and measuring a plurality of matching errors including the steps of:
  (d1) computing an oriented energy image of the image received from the camera;
  (d2) generating a set of scaled oriented energy images;
  (d3) selecting a scaled oriented energy image from the set of scaled oriented energy images; and
  (d4) integrating the selected scaled oriented energy image along the virtual projection of the set of relevant features and measuring the plurality of matching errors.
 (e) updating the estimate of the pose to reduce the plurality of matching errors.

12. A method for refining a three dimensional model of a scene using an image of the scene taken by a camera having an unknown pose, comprising the steps of:
 (a) comparing the image to a set of relevant features of the three dimension model of the scene to generate an estimate of the pose, the relevant features representing discontinuities in at least one of the surface normal or the material properties in the scene; and
 (b) updating the three dimensional model of the scene based on data from the image and the estimate of the pose.

13. The method claim 12, wherein step (b) includes the step of:
 (b1) projecting a plurality of color values of the image onto the three dimension model of the scene to update a texture of a surface of the three dimensional model.

14. A method for refining a three dimension model of a scene containing an object using a plurality of images of the scene, each image including the object, comprising the steps of:
 (a) comparing a first image of the plurality of images to the three dimension model of the scene to generate an estimate of a first viewpoint corresponding to the first image;
 (b) comparing a second image of the plurality of images to the three dimension model of the scene to generate an estimate of a second viewpoint corresponding to the second image;
 (c) selecting a first set of relevant features of the three dimensional model based on the first viewpoint;
 (d) matching a plurality of first features of the first image to the first set of relevant features and measuring a plurality of first matching errors;
 (e) selecting a second set of relevant features of the three dimensional model based on the second viewpoint;
 (f) matching a plurality of second features of the second image to the second set of relevant features and measuring a plurality of second matching errors; and
 (g) updating a position estimate of the object within the three dimensional model of the scene based on the plurality of first matching errors and the plurality of second matching errors.

15. The method of claim 14, further including the steps of:
 comparing the first image and the second image to generate relative pose constraints; and
 updating the first viewpoint and the second viewpoint based on the relative pose constraints.

16. The method of claim 15, wherein step of comparing the first image to the second image includes the steps of:
 matching the plurality of first features or the first image to the plurality of second features of the second feature to create a set of matched features;
 calculating optical flow for each matched feature; and
 generating the relative pose constraints responsive to the calculated optical flow.

17. The method of claim 15, wherein the step of comparing the first image to the second image includes the steps of;
 generating a plurality of parallax measurements between the plurality of first features and the plurality of second features; and
 generating the relative pose constraints responsive to the plurality of parallax measurements.

18. The method of claim 15, wherein step of comparing the first image to the second image includes the step of generating the relative pose constraints uses an epipolar geometry of the first image and the second image.

19. A method for refining a three dimension model of a scene containing an object using a plurality of images of the scene, each image including the object, comprising the steps of:
  (a) selecting a subset of images from the plurality of images of the scene, the subset of frames containing at least two of the images;
  (b) determining a plurality of approximate relative viewpoints of the subset of images;
  (c) comparing each image in the subset of images to the three dimensional model to generate a subset of estimated viewpoints corresponding to the subset of images, the subset of estimated viewpoints constrained by the plurality of approximate relative viewpoints;
  (d) selecting a set of relevant features of the three dimensional model corresponding to each estimated viewpoint;
  (e) matching a plurality of features of the each image in the subset of images to the corresponding set of relevant features and measuring a plurality of matching errors; and
  (f) updating a position estimate of the object within the three dimensional model of the scene based on the plurality of matching errors.

20. The method of claim 19, further comprising the step of:
  (g) repeating to steps (c), (d), (e), and (f) using the updated position estimate of the object until the plurality of matching errors are less than predetermined matching criteria.

21. The method of claim 19, wherein the subset of images is selected to have viewpoints within a predetermined range.

22. A computer readable medium adapted to instruct a general purpose computer to update a three dimensional model of a scene using the three dimensional model of the scene, an image received from a camera having an unknown pose, the method comprising the steps of:
  (a) generating an estimate of the pose;
  (b) selecting a set of relevant features of the three dimensional model based on the estimate of the pose, the relevant features representing discontinuities in at least one of a surface normal or material properties in the scene;
  (c) creating a virtual projection of the set of relevant features responsive to the estimate of the pose;
  (d) matching a plurality of features of an image received from the camera to the virtual projection of the set of relevant features, and measuring a plurality of matching errors;
  (e) updating the estimate of the pose to reduce the plurality of matching errors; and
  (f) updating the three dimensional model of the scene based on data from the image and the estimate of the pose.

23. An automatic three-dimensional model updating apparatus for accurately estimating a point of view of an image of a scene, relative to a three-dimensional model of the scene, and updating the three-dimensional model comprising:
  (a) estimating means for providing an estimate of the point of view of the image;
  (b) relevant feature selecting means for selecting a set of relevant features of the three dimensional model based on the estimate of the point of view, the relevant features representing discontinuities in at least one of a surface normal or material properties in the scene;
  (c) virtual projection means for creating a virtual projection of the set of relevant features responsive to the estimate of the point of view;
  (d) matching means for matching a plurality of features of the image to the virtual projection of the set of relevant features;
  (e) measurement means for measuring a plurality of matching errors;
  (f) point of view refinement means for updating the estimate of the point of view to reduce the plurality of marching errors; and
  (g) model refinement means, responsive to the estimated point of view and to the image, for updating the three-dimensional model.

* * * * *